June 9, 1959 R. K. LOCKHART 2,890,271
COLOR TELEVISION
Filed July 28, 1954
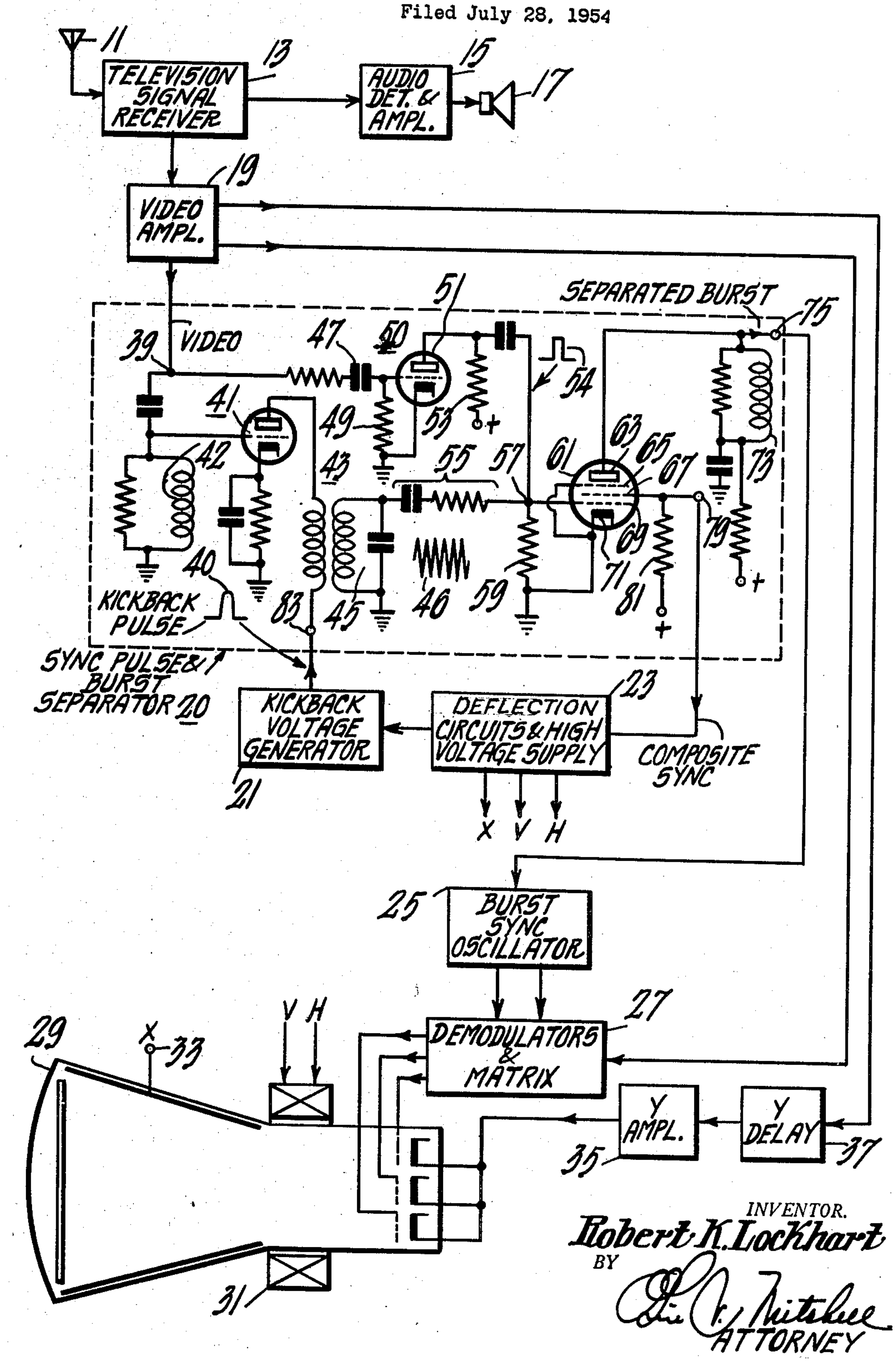
INVENTOR.
Robert K. Lockhart
BY
[signature]
ATTORNEY Patented June 9, 1959

2,890,271

COLOR TELEVISION

Robert K. Lockhart, Moorestown, N.J., assignor to Radio Corporation of America, a corporation of Delaware Application July 28, 1954, Serial No. 446,205

14 Claims. (Cl. 178—5.4)

The present invention relates to circuits for separating a plurality of synchronizing signals from an information signal containing synchronizing signals having various timing and frequency characteristics and more particularly to a simplified color synchronizing burst and deflection or scanning synchronizing pulse separator circuit for use in a color television receiver.

Color television provides for the electrical transfer of images and color. This transfer is accomplished by additive methods in which the color images are caused to be represented by both luminance information and by chrominance information from which component color signals may be recovered in the color television receiver by utilization of the processes of synchronous detection. In order that the color television image can be reconstructed on an image reproducer at the color television receiver, however, it is necessary that at least two types of synchronizing information accompany the information related directly to the image being transmitted. These two types of synchronizing information are the scanning synchronizing pulses which are utilized to control the deflection circuits employed in the color television receiver and a color synchronizing burst which is employed for synchronizing the phase and frequency of a local signal generator in the color television receiver so that the well known processes of synchronous detection can be employed.

The scanning deflection syncrhonizing information included in the transmitted signal is made up of the horizontal deflection synchronizing pulses which precede each scanning line and vertical deflection pulses which occur each scanning field. The horizontal synchronizing pulses are included in a horizontal blanking pulse which is allotted 16% of the time available for transmitting one horizontal line. The horizontal synchronizing pulse is approximately 5 $\mu$sec. in length and is transmitted within the horizontal blanking pulse wherein the leading edge of the horizontal synchronizing pulse is delayed behind the leading edge of the horizontal blanking pulse by approximately 1.25 $\mu$sec. The color synchronizing burst is included within the horizontal blanking pulse interval and consists essentially of at least 8 cycles of a 3.58 mc. signal on the back porch of the horizontal synchronizing pulse. The frequency of the color synchronizing burst is that of a modulated subcarrier utilized for transmission of the chrominance information; its phase bears prescribed relationship to the various color difference signals which are included in the modulated subcarrier.

In order for the color television receiver to properly utilize the luminance and chrominance information, it is necessary, for example, that the horizontal synchronizing pulses and the color synchronizing burst be disseminated to proper channels and circuitry which can utilize these particular types of synchronizing information; the present invention is devoted to teaching an improved and simplified method for not only separating the horizontal synchronizing pulses and the color synchronizing burst from the color television signal, but also for amplifying and separating of the color synchronizing burst and the horizontal synchronizing pulses.

It is therefore an object of this invention to provide a single electron device circuit which separates two synchronizing signals each having different time of occurrence and frequency characteristics from the composite signal which includes synchronizing information and image signals.

Another object of this invention is to provide an improved and simplified deflection synchronizing pulse and color synchronizing burst separator.

It is yet another object of this invention to provide a color television circuit which provides both separation and amplification of the color synchronizing burst and the deflection synchronizing pulses from the composite color television signal.

According to the invention, the deflection synchronizing pulses and the color synchronizing burst are separated from the composite color television signal by utilizing a clipper or limiter circuit for separating the deflection synchronizing pulses and a kickback pulse actuated gate circuit for separating the color synchronizing burst. The separated deflection synchronizing pulses and the separated color synchronizing burst are then recombined and applied to a multielectrode electron control device whose anode contains a burst frequency responsive output load circuit to which the separator burst appears and whose screen grid contains a composite synchronizing signal responsive output load to which there appears the composite synchronizing signal which includes the horizontal and vertical deflection synchronizing signal information.

All other and incidental objects of this invention will become apparent from a reading of the following specification and an inspection of the drawing which includes the block diagram of a color television receiver and which also includes a schematic diagram of one embodiment of a deflection synchronizing pulse-color synchronizing burst separator arranged in accordance with the teachings of the present invention.

Consider first the general aspects of the operation of the color television receiver shown in the drawing.

The incoming signal arrives at the antenna 11 and is applied to the television signal receiver 13. The television signal receiver 13 then delivers a recovered color television signal including the sound information, which is transmitted on a sound carrier 4½ mcs. removed from the picture carrier. The television signal receiver 13 includes the functions of first detection, intermediate frequency amplification, second detection and automatic gain control. Many of these functions are described in chapter 22 of the book "Harmonics, Sidebands and Transients in Communication Engineering" by C. Louis Cuccia, published by the McGraw-Hill Book Co. in 1952.

The sound information is then recovered by using, for example, the well known principles of intercarrier sound. In the audio detector and amplifier 15 the recovered sound in formation is then applied to the loud speaker 17.

The color television signal information relating to the image is accommodated in at least four channels of the color television receiver, these channels being adapted to produce the recovered color signals which are applied to the color kinescope 29.

One branch emanating from the video amplifier 19 is concerned with the deflection synchronizing pulses and the color synchronizing burst. This synchronizing information is applied to the terminal 39 of the sync pulse-burst separator 20 which produces a separated burst at its output 75 and a composite synchronizing signal at its output terminal 79. The composite synchronizing signal includes not only the synchronizing pulse, but also the color synchronizing burst. The composite synchronizing signal is then applied to the deflection circuits and high voltage supply 23 where the proper synchronizing pulses are utilized for actuating the deflection yokes 31 of the color kinescope 29 and for driving the kickback pulse generator 21 and for developing a high voltage which is applied to the ultor 33. A high voltage developing means generally consists of a winding included on the deflection transformer, and includes a rectifier and filter. The kickback pulse generator 21 has the function of providing a kickback pulse 40 during the horizontal blanking period for gating purposes. The timing of the kickback pulse is usually adjusted to make possible the separation of the color synchronizing burst from the color television signal.

The separated burst as produced at the output terminal 75 of the sync pulse-burst separator 20 is then applied to the burst sync oscillator 25 whose frequency and phase are accordingly synchronized to the frequency and phase prescribed by the color synchronizing burst. There are various methods whereby the burst sync oscillator 25 may be synchronized. These methods involve, for example, injection-locking, reactance tube automatic frequency control systems, or ringing circuit techniques. The output of the burst sync oscillator 25 is applied in one or more phases to the demodulators and matrix 27 to which is also applied the color television signal. Filtering, synchronous detection and signal reconstruction is performed in the demodulators and matrix 27 to produce a trio of color difference signals signified as $R-Y$, $G-Y$, and $B-Y$ signals, the Y denoting the luminance signal which is usually transmitted as the sum of contributions from three primary color signals according to the proportions 59% green, 33% red, and 11% blue. The $B-Y$, $G-Y$, and $R-Y$ signals then represent the deviation from the color information which is already included in the luminance or Y signal. The output of the video amplifier 19 also provides the color television signal in the form of the Y signal to the delay line 37 which impresses this signal on the Y amplifier 35 whose output is utilized to drive the cathodes of the color kinescope 29. With the $G-Y$, $R-Y$, and $B-Y$ color difference signals applied to appropriate control grids of the color kinescope 29, signal addition is accomplished, leading to reconstruction of the original R, G, and B signals which yield the recovered color television image on the image face of the color kinescope 29.

Consider now the teachings involved in the schematic diagram showing one embodiment of the present invention as included in the sync pulse-burst separator 20 in the drawing. The incoming color television signal is impressed on the input terminal 39. The input terminal 39 is coupled through the grid limiting network 50 to the control grid of the electron tube 51. By proper adjustment of the magnitudes of the resistor 49 and the condenser 47, grid limiting is provided in the electron tube 51 so that the synchronizing pulses 54 will be caused to appear across the output resistor 53 and, therefore, be impressed on the terminal 57 of the electron tube 61.

The color television signal is also applied to the control grid of the electron tube 41 which has a grid circuit including an inductance 42 across which a large voltage is developed by the horizontal synchronizing pulse. The output load of the electron tube 41 is the transformer 43 whose secondary circuit 45 is tuned to the frequency of the color synchronizing burst. The potential supply for the output load of the electron tube 41 is the kickback pulse 40 which drives the output load and, therefore, the anode of the electron tube 41 positive only during the duration of the color synchronizing burst so that a separated color synchronizing burst 46 is delivered by the coupling circuit 55 to the terminal 57 of the electron tube 61.

The terminal 57 of the electron tube 61 is the input terminal which is coupled to the control grid 69. At this terminal 57 has been applied both the separated color synchronizing burst 46 and the synchronizing pulses 54. Note that the electron tube 61 is a multielectrode electron tube and utilizes its anode 63 as one output terminal and its screen grid 67 as a second output terminal.

The anode 63 of the electron tube 61 is coupled to a plate circuit which includes the inductance 73. The inductance 73 is of sufficient magnitude to cause considerable gain at the frequency, 3.58, of the color synchronizing burst and of vastly reduced gain with respect to the frequencies which are involved as the fundamental or higher harmonics of the synchronizing pulses. Therefore, the separated burst will appear substantially alone in an amplified fashion across the inductance 73 and, therefore, at the output terminal 75. At the screen grid 67, however, which utilizes an output resistor 81, a composite synchronizing signal, including both the deflection synchronizing pulses and the color synchronizing burst, is provided to the output terminal 79. This composite synchronizing signal is then provided to the deflection circuits and high voltage supply 23 which, by using suitable differentiating and integrating circuits in a manner well known in the art, easily removes the color synchronizing burst from the composite synchronizing signal and performs the additional function of separating the synchronizing pulses into those, for example, which are utilized for synchronizing the horizontal deflection circuits, and those which are utilized for synchronizing the vertical deflection circuits. It is important to note that the use of the electron tube 61 in conjunction with a pair of output circuits emanating, for example, from the anode 63 and the screen grid 67, respectively, has eliminated the need for having a separate amplifier tube for both the color synchronized burst and the synchronizing pulses, thereby vastly simplifying the circuit involved, resulting in both simplification and economy of operation.

Having described the invention, what is claimed is:

1. In a television receiver, said television receiver adapted to receive a color television signal, said color television signal including deflection synchronizing signals and color synchronizing bursts, a synchronizing signal separator circuit, comprising in combination, a first signal separator circuit, said first signal separator circuit coupled to said color television signal and including apparatus for separating said deflection synchronizing signals from said color television signal, a second signal separator circuit, said second signal separator circuit coupled to said color television signal and including apparatus for separating said color synchronizing bursts from said color television signal, a signal adder circuit, said signal adder circuit responsive to said first signal separator circuit and said second signal separator circuit and adjusted to form a composite signal of said deflection synchronizing signals and said color synchronizing bursts, a third signal separator circuit, said third signal separator circuit coupled to said signal adder circuit and including apparatus for separating said color synchronizing bursts from said composite signal.

2. In a signalling system, said signalling system adapted to receive a signal including a plurality of synchronizing signals, said plurality of synchronizing signals including synchronizing pulses having predetermined duration intervals and synchronizing bursts, each of said synchronizing bursts having prescribed frequency and phase and existing during prescribed duration intervals, and whereby said synchronizing bursts and said synchronizing pulses do not occur simultaneously, a synchronizing signal separator circuit, comprising in combination, means for separating both said synchronizing pulses and said synchronizing bursts from said signal and recombining said synchronizing pulses and said synchronizing bursts to form a composite synchronizing signal, a separator device, said separator device having at least a first output terminal and a second output terminal and a control electrode, means for coupling said composite synchronizing signal to said control electrode, a first output circuit, said first output circuit having prescribed frequency characteristics which yield predetermined amplification characteristics in said separator device for said synchronizing burst, means for coupling said first output circuit to said first control electrode, a second output circuit, said second output circuit coupled to said second output terminal, and having impedance characteristics whereby said composite synchronizing signal appears in said second output circuit at a predetermined amplitude level.

3. The invention as set forth in claim 2 and wherein said separator device is a multielectrode electron tube and wherein said first output terminal is the anode of said multielectrode electron tube and wherein said second output terminal is a screen grid of said multielectrode electron tube.

4. The invention as set forth in claim 2 and wherein said signal is a color television signal which is characterized by said synchronizing bursts constituting color synchronizing signals, each following a prescribed synchronizing pulse.

5. The invention as set forth in claim 2 and wherein said means for separating said synchronizing pulses and said synchronizing burst from said signal include a first circuit, said first circuit characterized in that it produces limiter separation action which yields a separation of said synchronizing pulses from said signal, and a second circuit, said second circuit constituting a gate circuit wherein said signal is caused to pass through said gate circuit only during substantially the intervals of said synchronizing pulses.

6. The invention as set forth in claim 2 and wherein said first output circuit includes an inductance.

7. In a color television receiver, said color television receiver adapted to receive a color television signal, said color television signal including vertical synchronizing pulses, and horizontal synchronizing pulses and color synchronizing bursts, said color synchronizing burst having predetermined frequency and phase and included on the back porch of said horizontal synchronizing pulses, a synchronizing signal separator circuit, comprising in combination, a first circuit means, said first circuit means including apparatus for separating said synchronizing pulses from said color television signal, a second circuit means, said second circuit means including apparatus for separating said color synchronizing burst from said color television signal to form separated bursts, means for combining said separated burst in said separated synchronizing pulses to form a composite synchronizing signal, a signal separated device, said signal separator device having a control electrode and at least a first output electrode and a second output electrode, means for coupling said composite synchronizing signal to said control electrode, a first output circuit, said first output circuit coupled to said first output electrode and having predetermined impedance characteristics whereby substantially only said synchronizing bursts are developed in said first output circuit, a second output circuit, said second output circuit coupled to said second output electrode and having impedance characteristics whereby the synchronizing signals contained in said composite synchronizing signal are reproduced in said second output circuit according to a predetermined output signal versus frequency relationship.

8. The invention as set forth in claim 7 and wherein said second circuit includes a gate circuit whose gate is opened at a time which permits separation of said synchronizing burst from said color television signal.

9. The invention as set forth in claim 7 and wherein said first circuit is a clipping circuit.

10. The invention as set forth in claim 7 and wherein said first output circuit is a circuit having inductive reactance characteristics.

11. In a color television receiver, said color television receiver adapted to receive a color television signal, said color television signal including vertical synchronizing pulses, and horizontal synchronizing pulses and color synchronizing bursts, said color synchronizing burst having predetermined frequency and phase and included on the back porch of said horizontal synchronizing pulses, a synchronizing signal separator circuit, comprising in combination, a clipper limiting circuit, said clipper limiting circuit including apparatus whereby said color television signal is clipped and limited to produce only separated synchronizing pulses at said output terminal, a gate circuit, a kickback voltage generator, said kickback voltage generator responsive to said synchronizing pulses and adapted to yield a kickback pulse having a duration interval at least that of said synchronizing burst, means for applying said color television signal and said kickback pulses to said gate circuit whereby said color synchronizing bursts are separated from said color television signal, means for combining said separated color synchronizing bursts and the separated synchronizing pulses appearing at said output terminal of said clipper limiter circuit to form a composite synchronizing signal, a separator electron control device, said separator electron control device having at least a control electrode, a first output electrode and a second output electrode, means for coupling said composite synchronizing signal to said control electrode, a first output circuit, said first output circuit having principally inductive characteristics and coupled to said first output electrode whereby substantially only said separated color synchronizing bursts appear in said first output circuit, a second output circuit, said second output circuit coupled to said second output electrode and having impedance characteristics whereby frequency components of said composite signal are reproduced in said second output circuit according to a predetermined output signal versus frequency relationship curve, means for utilizing said color synchronizing bursts appearing in said first output circuit for color selection in said color television receiver, means for applying said synchronizing signals appearing in said second output circuit to suitable utilization means in said color television receiver.

12. The invention as set forth in claim 6 and wherein said separator electron control device is principally a multi-electrode electron tube having at least a first control grid, an anode and a screen grid, means for utilizing said first control grid as said control electrode, means for utilizing said anode as said first output electrode and means for utilizing said screen grid as said second output electrode.

13. In a television receiver, said television receiver adapted to receive a color television signal, said color television signal including a first synchronizing signal and a second synchronizing signal, synchronizing signal separator means comprising in combination, signal separator means employed to independently separate said first synchronizing signal and said second synchronizing signal from said color television signal, composite signal combining circuit means coupled to said signal separator means and utilized to form a composite signal wherein said first synchronizing signal and said second synchronizing signal which are separated in said signal separator means are recombined, a synchronizing signal responsive circuit coupled to said composite signal combining circuit means for developing said first synchronizing signal independent of said composite signal.

14. In a television receiver adapted to receive a color television signal including deflection synchronizing pulses and color synchronizing bursts which occur during different time intervals during each scanning retrace interval, the combination of: first circuit means to provide said color television signal; first signal separator means having a first and second output circuit and connected to said first circuit means and including apparatus to separate said deflection synchronizing pulses from said color television signal and to produce said separated pulses at said first output circuit and to separate said color synchronizing bursts from said color television signal and to develop said separated bursts at said second output circuit; signal adder means coupled to said first and second output circuits to develop a composite signal representing said separated bursts combined with said separated pulses; and second signal separator means coupled to said signal adder means to separate said bursts from said composite signal.

References Cited in the file of this patent

UNITED STATES PATENTS

| | | |
|---|---|---|
| 2,594,380 | Barton | Apr. 29, 1952 |
| 2,653,187 | Luck | Sept, 22, 1953 |
| 2,713,608 | Sonnenfeldt | July 19, 1955 |
| 2,793,246 | Olive | May 21, 1957 |